US012692046B2

(12) United States Patent
Li

(10) Patent No.: US 12,692,046 B2
(45) Date of Patent: Jul. 28, 2026

(54) METHODS AND ASSEMBLIES FOR PACKAGING CONTAINERS FOR COMPOSITIONS CONTAINING ACTIVE INGREDIENTS

(71) Applicant: MEDISCA PHARMACEUTIQUE INC., Saint-Laurent (CA)

(72) Inventor: Peng Li, Quebec (CA)

(73) Assignee: MEDISCA PHARMACEUTIQUE INC., Saint-Laurent (CA)

( * ) Notice: Subject to any disclaimer, the term of this patent is extended or adjusted under 35 U.S.C. 154(b) by 0 days.

(21) Appl. No.: 18/812,036

(22) Filed: Aug. 22, 2024

(65) Prior Publication Data

US 2024/0409270 A1 Dec. 12, 2024

Related U.S. Application Data

(63) Continuation of application No. PCT/CA2023/050271, filed on Mar. 2, 2023.

(Continued)

(51) Int. Cl.

*A61J 1/16* (2023.01)
*B65D 1/36* (2006.01)

(Continued)

(52) U.S. Cl.

CPC .............. *B65D 25/106* (2013.01); *A61J 1/16* (2013.01); *B65D 1/36* (2013.01); *B65D 25/101* (2013.01);

(Continued)

(58) Field of Classification Search

CPC .... B65D 25/106; B65D 25/101; B65D 25/10; B65D 1/36; B65D 43/0202; B65D 2543/00361; A61J 1/16

(Continued)

(56) References Cited

U.S. PATENT DOCUMENTS 4,444,310 A * 4/1984 Odell .................... A61M 5/002 206/366
4,667,837 A * 5/1987 Vitello ................ A61M 5/5086 215/253

(Continued)

FOREIGN PATENT DOCUMENTS

WO 2018020505 A1 2/2018

OTHER PUBLICATIONS

International Search Report for International Application No. PCT/CA2023/050271, dated May 18, 2023 (5 pages).

(Continued)

*Primary Examiner* — Steven A. Reynolds
(74) *Attorney, Agent, or Firm* — Finnegan, Henderson, Farabow, Garrett & Dunner LLP

(57) ABSTRACT

Described is a holding system comprising a plurality of container bodies and a plurality of caps, each of the plurality of caps being configured for closing a respective corresponding one of the plurality of container bodies; and a supporting structure for concurrently and separately supporting the plurality of container bodies and the plurality of caps in an organized arrangement, the plurality of container bodies being configured for receiving one or more ingredient for medical, pharmaceutical, cosmetic, or recreational applications. The holding system may be suitable for manual, semi-automated, or automated operations.

27 Claims, 10 Drawing Sheets

Related U.S. Application Data

(60) Provisional application No. 63/315,844, filed on Mar. 2, 2022.

(51) Int. Cl.
*B65D 25/10* (2006.01)
*B65D 43/02* (2006.01)

(52) U.S. Cl.
CPC .................... *B65D 43/0202* (2013.01); *B65D 2543/00361* (2013.01)

(58) Field of Classification Search
USPC .................................................. 206/565, 438
See application file for complete search history.

(56) References Cited

U.S. PATENT DOCUMENTS

| | | | | |
|---|---|---|---|---|
| 4,978,004 | A | 12/1990 | Silverstein et al. | |
| 5,112,574 | A | 5/1992 | Horton | |
| 7,255,231 | B2 * | 8/2007 | Andrews | B65D 85/32 206/521.1 |
| 8,360,238 | B2 | 1/2013 | Nicoletti | |
| 8,419,713 | B1 * | 4/2013 | Solomon | A61M 39/10 604/533 |
| 8,544,665 | B2 | 10/2013 | Bogle et al. | |
| 9,399,125 | B2 * | 7/2016 | Burkholz | A61M 39/162 |
| 9,555,911 | B2 * | 1/2017 | Pawlowski | A61M 5/001 |
| 10,919,043 | B2 * | 2/2021 | Johns | B01L 9/06 |
| 11,161,633 | B2 * | 11/2021 | Dinka | B67B 1/04 |
| 11,161,671 | B2 * | 11/2021 | Yoshida | A61M 5/008 |
| 2005/0236346 | A1 * | 10/2005 | Whitney | B01L 9/06 211/74 |
| 2011/0226662 | A1 * | 9/2011 | Nicoletti | B65D 25/101 206/562 |
| 2013/0292275 | A1 * | 11/2013 | Smart | B65D 51/2835 220/521 |
| 2015/0114871 | A1 * | 4/2015 | Fitzpatrick | A61J 1/16 206/508 |
| 2015/0238263 | A1 | 8/2015 | Nicoletti et al. | |
| 2015/0314120 | A1 * | 11/2015 | Gardner | A61M 39/16 206/438 |
| 2019/0054472 | A1 * | 2/2019 | Kusogullari | B01L 9/06 |
| 2020/0130894 | A1 * | 4/2020 | Kusogullari | B65D 25/108 |
| 2021/0031980 | A1 * | 2/2021 | Kloke | B65D 1/34 |
| 2022/0096732 | A1 * | 3/2022 | Komann | B65D 25/108 |

OTHER PUBLICATIONS

Written Opinion of the International Searching Authority for International Application No. PCT/CA2023/050271, dated May 18, 2023 (4 pages).

* cited by examiner

METHODS AND ASSEMBLIES FOR PACKAGING CONTAINERS FOR COMPOSITIONS CONTAINING ACTIVE INGREDIENTS

CROSS REFERENCE TO RELATED APPLICATION

The present application is a continuation of International Application No. PCT/CA2023/0502711 filed on Mar. 2, 2023, which claims the benefit of U.S. provisional patent application Ser. No. 63/315,844 filed on Mar. 2, 2022. The contents of the above-referenced documents are incorporated herein by reference in their entirety.

TECHNICAL FIELD

The present disclosure relates to the field of methods, systems and assemblies for packaging containers used for packaging composition(s) containing active ingredient(s).

BACKGROUND

There are many styles and shapes of containers intended for compositions containing active ingredients, namely medical, pharmaceutical, cosmetic, or recreational ingredients, which can be used for the preservation, storage, dispensing, and use of the filled compositions. For example, the styles and shapes may include round, oval, rectangular, or square cross-section, with or without a neck and shoulders, etc., which can be made of suitable materials such as plastic, metal, composite material, or glass, which are sterile or non-sterile, which require a cap, a stopper, and the like.

Packaging, transportation, storage and filling operations for such variable containers styles and shape may be labor intensive or require special skill to ensure meeting good manufacturing practice, sterility, reduced hardware damages, efficiency objectives, and the like. For example, when wishing to meet sterility objectives, containers components (e.g., container bodies and corresponding caps) are typically packaged in separate sterile packages for transportation, storage and processing. Processing operations under sterile conditions may thus require unpacking the separate components from respective packages, filling the container with the desired active ingredients under sterile conditions, such as in a sterile fume hood or sterile tunnel, optionally assembling the container with metered dosage means, and then sealing the containers with a cap or stopper.

The variability in container shape and style, and the variable and different skill set required for handling same is compounded with the recent shift towards automation. There remains a need for improved methods, systems and assemblies for packaging containers used for composition(s) containing one or more active ingredient(s).

SUMMARY

This Summary is provided to introduce a selection of concepts in a simplified form that are further described below in the Detailed Description. This Summary is not intended to identify key aspects or essential aspects of the claimed subject matter.

This description relates to an holding system configured to operate as a holding system for containers. The containers are configured for receiving one or more active ingredient(s) for medical, pharmaceutical, cosmetic, or recreational applications. Such holding system can be used during transport, storage, packaging and filling operations.

In one broad aspect, the present disclosure relates to a holding system, comprising: a plurality of container bodies and a plurality of caps, each of the plurality of caps being configured for closing a respective corresponding one of the plurality of container bodies; and a supporting structure for concurrently and separately supporting the plurality of container bodies and the plurality of caps in an organized arrangement, the plurality of container bodies being configured for receiving one or more ingredient for medical, pharmaceutical, cosmetic, or recreational applications.

For example, after having dispensed one or more active ingredient(s) into a respective container body, the container body and a corresponding cap can be assembled to form the commercial container. Eventually, the commercial container is sold to a customer (e.g., a patient or an end-user).

In some embodiments, the holding system can be adapted to work with a variety of automated filling devices for dispensing the one or more active ingredient(s) into a container body, and assembling the container body and a corresponding cap.

In some embodiments, the holding system can be used for manually dispensing the one or more active ingredient(s) into a container body, and assembling the container body and a corresponding cap.

In some embodiments, the holding system includes one or more of the following features:

- the supporting structure includes a top surface having at least one container-supporting region configured to contain the plurality of container bodies and at least one cap-supporting region configured to contain the plurality of caps.
- the at least one container-supporting region includes a plurality of container-supporting recesses each configured to releasably receive a respective one of the plurality of container bodies.
- the at least one cap-supporting region includes a plurality of cap-supporting recesses each configured to releasably receive a respective one of the plurality of caps.
- the container-supporting recesses and the cap-supporting recesses are arranged in a regular, periodic and alternating arrangement, such that a cap lies right next to a respective container body.
- the plurality of container-supporting recesses are disposed in a first segment of the top surface and the plurality of cap-supporting recesses are disposed in a second segment of the top surface.
- only one vertical line of container bodies lies next to only one vertical line of caps.
- the container-supporting recesses are configured to prevent the plurality of container bodies from dropping by gravity, out of the container-supporting recesses, when the supporting structure is turned upside down.
- the cap-supporting recesses are configured to prevent the plurality of caps from dropping by gravity, out of the cap-supporting recesses, when the supporting structure is turned upside down.
- further comprising a lid configured for mating with at least a peripheral upper surface of the supporting structure, thus enclosing the plurality of container bodies and the plurality of caps.
- at least one of the lid and the supporting structure further include sealing means for assembling the lid and the supporting structure together such that the interior of the holding system remains sealed from the environment.

the lid and support structure can be separated and be assembled together repeatedly.

the sealing means include protrusions and corresponding recesses, which cooperate with each other in a positive-fit manner, formed at either one of a peripheral portion of the support structure and of a mating peripheral portion of the lid.

the plurality of container bodies and the plurality of caps are nested in the holding system in an upright position to allow axial movement to remove the container bodies and the caps from the holding system.

the system is enclosed in an outer plastic packaging

All features of exemplary embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

A detailed description of specific exemplary embodiments is provided hereinbelow with reference to the accompanying drawings in which.

Figure 1A:
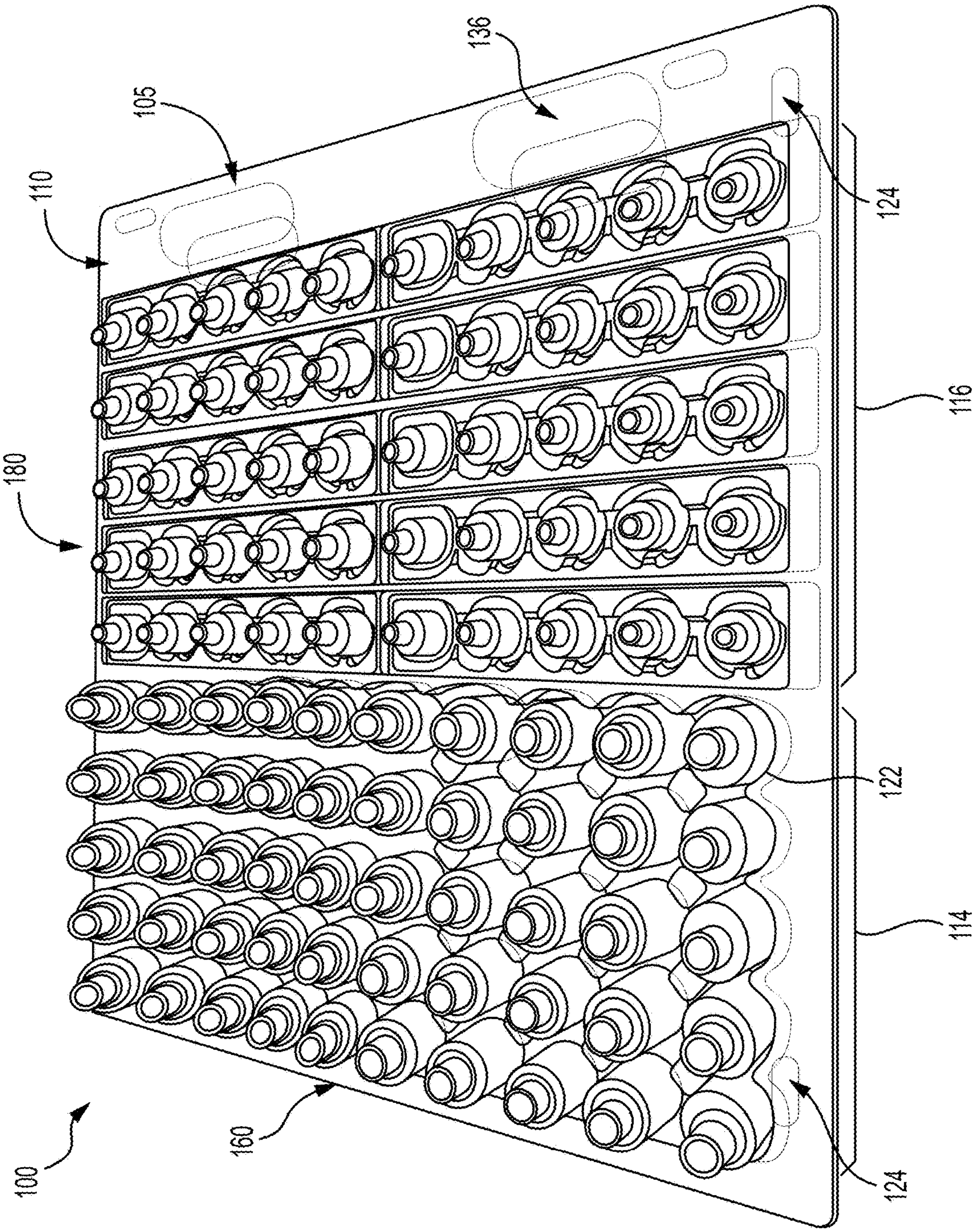
FIG. 1A shows a non-limiting example of a structural support containing a plurality of container bodies and a plurality of caps, in accordance with an embodiment of the present disclosure.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION

The present technology is explained in greater detail below. This description is not intended to be a detailed catalog of all the different ways in which the technology may be implemented or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art considering the instant disclosure which variations and additions do not depart from the present technology. Hence, the following description is intended to illustrate some embodiments of the technology, and not to exhaustively specify all permutations, combinations, and variations thereof.

The present inventor has designed and developed a holding system for containers for receiving one or more active ingredient(s) for medical, pharmaceutical, cosmetic, or recreational applications. The holding system may be provided as a preloaded holding system—in other words, the system may include a plurality of empty container bodies and a plurality of caps, each of the plurality of caps being configured for closing a respective corresponding one of the plurality of container bodies.

Such holding system has a number of technical and commercial advantages, as will be apparent to the person of skill in view of the present disclosure.

In some embodiments, such holding system may provide an enhanced transport and packaging solution for containers configured for receiving the one or more active ingredient (s). The holding system can be configured to allow a rapid removal or processing of the containers accommodated in the holding system so that these are ready to be filled, particularly when performing so-called ready-to-fill processes, and are ready to be sealed with a cap.

In some embodiments, the plurality of container bodies and the plurality of caps are nested in the holding system in an upright position to easily allow axial movement to remove the container bodies and the caps from the holding system.

In some embodiments, such holding system can concurrently and separately accommodate a plurality of container bodies and a plurality of caps in an organized arrangement, thus facilitating processing in a simple and cost-effective manner. For example, such processing may include filling a container body with one or more active ingredient(s) and assembling the container body with a corresponding cap. For example, such processing may be performed with an automated or semi-automated system, or can be performed manually.

In some embodiments, such holding system can concurrently and separately accommodate a plurality of container bodies and a plurality of caps in an organized arrangement. For example, in such manner that a collision or direct contact of directly adjacent container bodies and/or caps is prevented. The plurality of container bodies and the plurality of caps are thus arranged reliably and free of collisions and at predetermined positions in the interior of the holding system, so that the container bodies can be transferred easily to automated processing stations and/or can be processed further in such automated processing stations.

In some embodiments, such holding system can concurrently and separately accommodate a plurality of container bodies and a plurality of caps of different sizes (length and diameter) and of virtually any shape reliably and without contact between container bodies, such as bottles, vials, syringes, dual-chamber syringes, cartridges, dual-chamber cartridges or vapes.

In some embodiments, such holding system can be configured for concurrently and separately accommodating the plurality of container bodies and the plurality of caps allowing operations under sterile conditions. For example, with the use of a supporting structure for accommodating the plurality of container bodies and the plurality of caps therein, where the supporting structure is configured for holding the container bodies and caps in a more or less tight fit fashion sufficient to prevent the container bodies and caps from dropping by gravity, out of the supporting structure when the supporting structure is turned upside down. Such feature is particularly useful when operating under sterile conditions, since turning the supporting structure upside down prevents contamination of the inside of the container bodies by air borne particles.

In some embodiments, such holding system may further include a lid configured for mating with at least a peripheral upper surface of the supporting structure, thus enclosing the container bodies and the caps. The supporting structure and the lid can be handled separately and can be assembled together to jointly form the holding system, thus sealing the plurality of container bodies and the plurality of caps from the environment. At least one of the lid and the supporting structure may further include sealing means assembling the lid and the supporting structure together such that the interior of the holding system remains sealed from the environment. Such configuration may further advantageously allow operations under sterile conditions, since the container bodies and the caps can be sterilized within the enclosure formed by the supporting structure and the lid.

In some embodiments, the sealing means enables a reliable sealing of the interior of the enclosure formed by the supporting structure and the lid against the environment, which may be in principle also configured for a sterile storage of container bodies and caps in the interior. Preferably, the lid and support structure can be separated and be assembled together repeatedly, for example, for the temporary removal of container bodies for further processing in a processing station and their subsequent packaging, e.g. for a sterile transport to another processing station or to the end customer. The enclosure formed by the supporting structure and the lid described herein can thus be opened and sealed again virtually for any number of times.

In some embodiments, the structural support and the lid can have almost any shape as long as they can form a closed enclosure in the assembled state. A structural support and lid having plate-shaped side walls and/or bottoms have turned out to be of particular use, wherein the side walls preferably form the sidewalls of the enclosure in the assembled state of the structural support and the lid.

In some embodiments, for enabling an even quicker and more reliable opening and closing of the enclosure formed by the supporting structure and the lid described herein, the structural support and the lid can be locked directly to one another to form the enclosure formed by the supporting structure and the lid. In one example, this locking may be accomplished by means of locking means provided on the outer surface of the enclosure formed by the supporting structure and the lid. In another example, this locking may be accomplished by means of locking means provided directly on the structural support and/or lid. In yet another example, this locking may be accomplished by means of an appropriate design, in particular of a peripheral portion of the structural support and of a mating peripheral portion of the lid in order to lock the structural support and the lid when these are assembled or stuck together to form the enclosure formed by the supporting structure and the lid.

In some embodiments, when assembling together the structural support and the lid, the locking means are in mechanical engagement with each other, to cause the aforementioned locking. Conveniently, for this purpose protrusions and corresponding recesses, which cooperate with each other in a positive-fit manner, can be formed at either one of a peripheral region of the support structure and of a mating peripheral region of the lid. Such protrusions and corresponding recesses can be biased towards each other resiliently, in particular as the result of the material properties of the peripheral regions or by means of resilient return members, such as by means of springs or the like.

In some embodiments, the supporting structure can be configured in such a manner that the plurality of container bodies and the plurality of caps are supported by friction or clamped. For frictional supporting or clamping, the supporting structure includes a plurality of container-supporting recesses and a plurality of cap-supporting recesses. These recesses are preferably formed such that they are circumferential and extend in the longitudinal direction of the respective container bodies and caps over a bottom portion thereof, allowing grabbing an upper portion thereof for removal from the supporting structure. As is well-known, a frictional coupling only requires a sufficient normal force onto the surfaces to be coupled together. The mutual axial displacement between the container body and supporting structure, and mutual axial displacement between the cap and supporting structure, can be prevented as long as the counteracting force caused by the static friction between the supporting structure and the container body or cap is not exceeded. The frictional holding effect stops and the surfaces slide on each other, if the tangential load force is greater than the static friction.

Suitably the frictional coupling is accomplished at lower respective portions of the container body and of the cap, so that an access to the top portion of the container bodies and the caps accommodated in the supporting structure is in general possible. In other words, the container bodies can be processed batch-wise in the supporting structures, and remain supported reliably and free of collisions in the supporting structure during the further processing. Such configuration may result in significant advantages with regard to processing speed and in benefits for the automation of processing units and thus overall results in even more economical and more cost-efficient processes.

In some embodiments, the supporting structure and/or lid can be advantageously formed of a material that is capable of being sterilized. This may be advantageous, for example, when the one or more active ingredient(s) dispensed into the container body is for a medical or pharmaceutical use. For example, the supporting structure and/or lid can be partially or wholly formed of a material that is capable of being sterilized, such as plastic materials (e.g., polyetheretherketone (PEEK), polyphenylsulfone (PPSU), Acetal Copolymer (POM-C), polypropylene (PP), etc.), metals (e.g., stainless steel), and the like. Sterilization can occur in any manner known in the art and suitable for the material used, such as sterilization by heat, steam, autoclaving, microwaving, UV light, chemical application, etc. For example, autoclaving can be performed according to DIN EN 285, where all surfaces of the objects being sterilized are exposed to pure saturated water vapor at 273.2° F. for at least three minutes, for example.

Specific non-limiting implementations of components of the holding system for containers and caps of the present disclosure will now be described in further details.

FIG. 1A shows a non-limiting implementation of holding system 100 configured to operate as a holding system for containers.

In some embodiments, the holding system 100 includes a supporting structure 105 for concurrently supporting a plurality of container bodies 160 and a plurality of container caps 180. The plurality of container bodies 160 and the plurality of container caps 180 can be assembled into capped containers for storage of compositions containing one or more active ingredients for medical, pharmaceutical, cosmetic, or recreational applications.

While the container body 160 and the container cap 180 shown in the Figures can be assembled in the form of a dropper bottle, other type of containers and caps are also envisioned in the context of the present disclosure. The container body 160 is typically a hollow element that presents an elongated shape in a direction that is referred to as the longitudinal axis of the container, as shown in FIG. 2B. The container body 160 is configured for receiving one or more active ingredients for medical, pharmaceutical, cosmetic, or recreational applications. For example, the container body 160 can be made of glass or plastics, e.g. cyclo-olefins polymers or copolymers, or any materials or composites, which are compatible with the one or more active ingredients the container is intended to contain. While, in the following, generally cylindrical profile container body 160 are described, it should be noted that the container body 160, in the sense of the present disclosure, may also have a different profile, for example a square, rectangular or polygonal profile.

Referring back to FIG. 1A, the supporting structure 105 can have a predetermined shape e.g., a generally planar rectangular carrier. The supporting structure 105 can be configured for concurrently supporting the plurality of container bodies 160 and the plurality of caps 180 in an organized arrangement.

The supporting structure 105 includes a top surface 110 having a number of features.

In some embodiments, the top surface 110 may include at least one container-supporting region 114 having a plurality of container-supporting recesses 122 (best shown in FIG. 2A) in an arranged configuration. For example, the plurality of container-supporting recesses 122 can be disposed in the container-supporting region 114 in at least one vertical line across the top surface 110. The top surface 110 may further include at least one cap-supporting region 116 having a plurality of cap-supporting recesses 120 (best shown in FIGS. 3A and 4A) in an arranged configuration. For example, the plurality of cap-supporting recesses 120 can be disposed in the cap-supporting region 116 in at least one vertical line across the top surface 110.

Figure 1B:
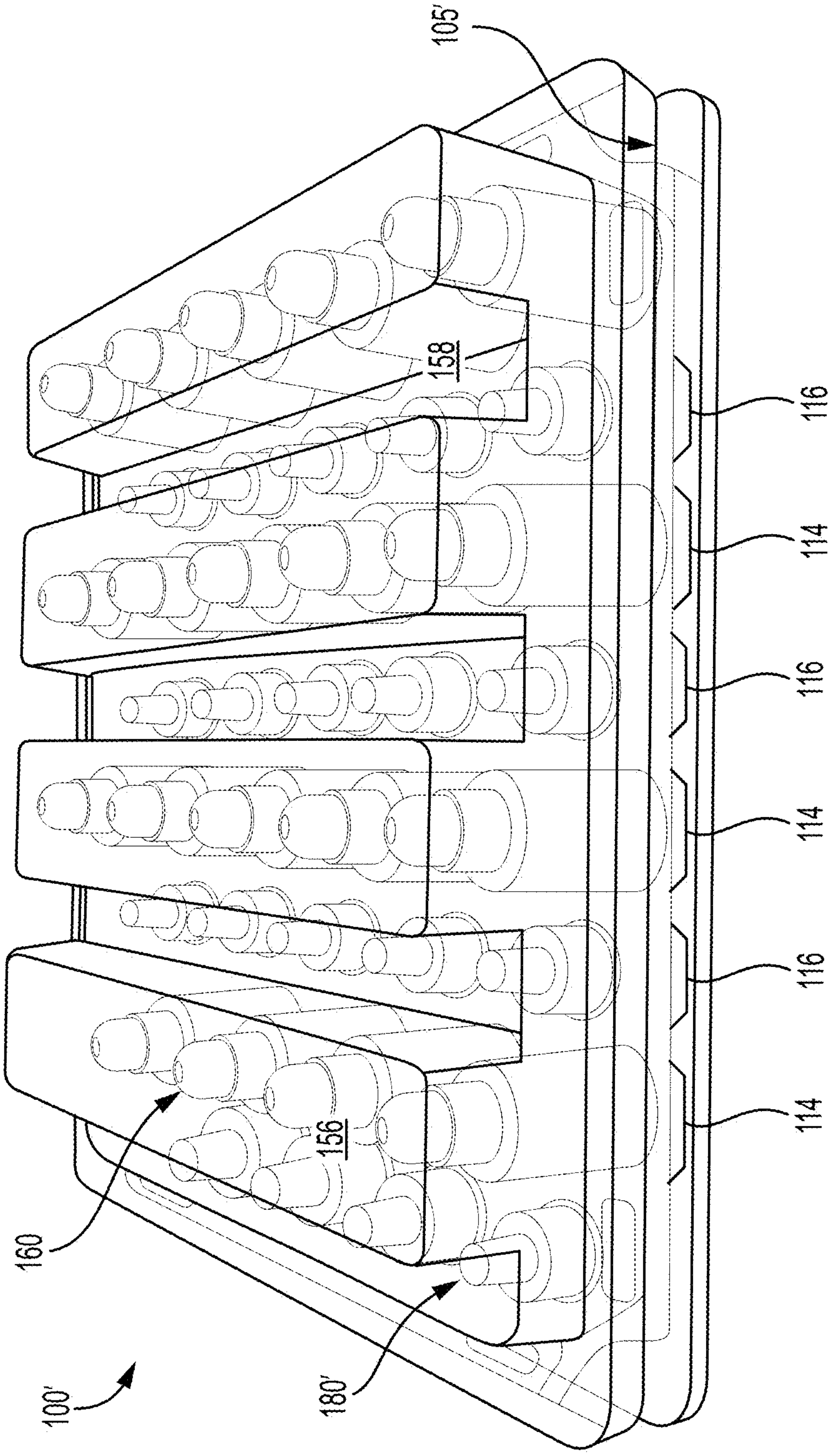
FIG. 1B shows a non-limiting variant of the structural support of FIG. 1A, in accordance with an embodiment of the present disclosure.

In some embodiments, the top surface 110 includes a plurality of container-supporting regions 114 and a plurality of cap-supporting regions 116 arranged in a regular, periodic and alternating arrangement, as shown for the holding system variant 100' with the supporting structure variant 105' shown in FIG. 1B. In other words, the top surface 110 can include alternating container-supporting regions 114 and cap-supporting regions 116 across its surface, where one container-supporting region 114 and one cap-supporting region 116 lie next to each other in a repeating arrangement, so that a cap 180' lies right next to a respective container body 160.

In some embodiments, the top surface 110 includes a plurality of container-supporting regions 114 disposed in a first segment of the top surface 110 and a plurality of cap-supporting regions 116 disposed in a second segment of the top surface 110, as shown in FIG. 1A. In other words, the top surface 110 can include a first block of the plurality of container-supporting regions 114 and a second block of the plurality of cap-supporting regions 116 lying next to each other so that container bodies are within one segment of the top surface 110 and caps are within another separate segment of the top surface 110. For example, with only one vertical line of container bodies lying next to only one vertical line of caps 180, 180'.

In some embodiments, the container-supporting region 114 includes a plurality of container bodies 160 in an arranged manner. For example, as shown, the plurality of container bodies 160 can be arranged as a matrix forming columns (as shown in FIG. 1A) or columns and rows (as shown in FIG. 1B).

In some embodiments, the cap-supporting region 116 includes a plurality of caps 180, 180' in an arranged manner. For example, as shown, the plurality of caps 180, 180' can also be arranged as a matrix forming columns (as shown in FIG. 1A) or columns and rows (as shown in FIG. 1B).

In some embodiments, such matrices are advantageously formed with substantially evenly spaced columns and/or rows, which can facilitate handling of the containers and caps during filling or assembling operations, in particular by automated stations. The substantial even arrangement of the container bodies and caps also simplifies the automatic filling procedure. This arrangement facilitates the treatment and processing of containers considerably because the effort in terms of adjustment, control and automation can be simplified. The term “even arrangement” considers unavoidable tolerances of lengths and distances in manufacturing.

Figure 2A:
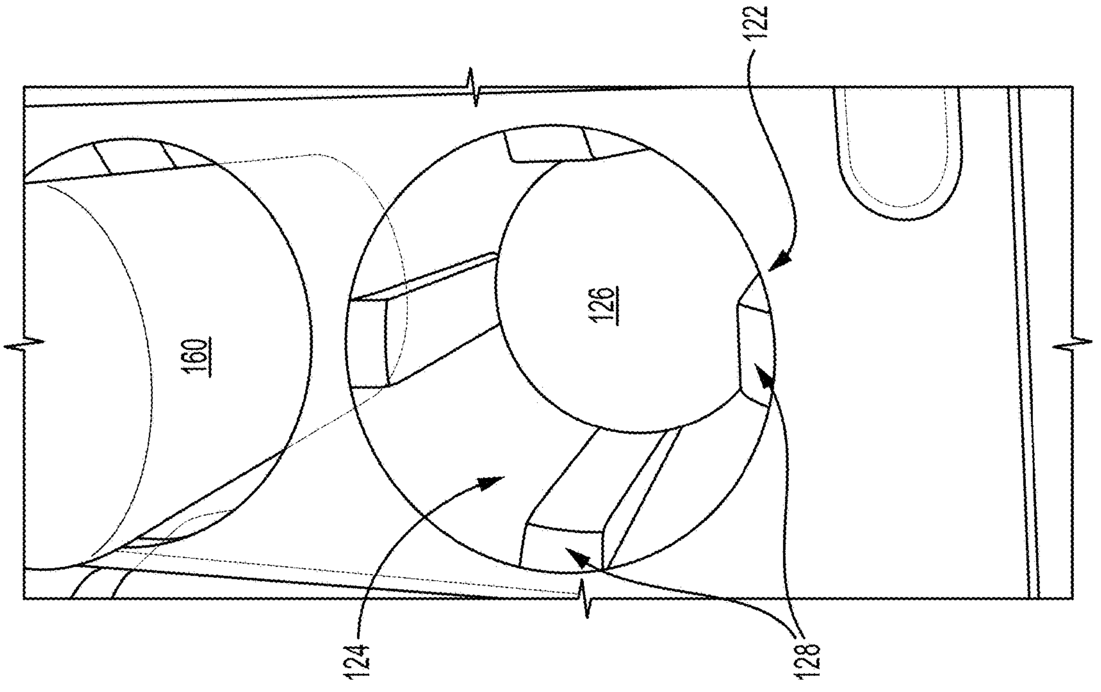
FIG. 2A is a non-limiting close up view of the structural support of FIG. 1 showing a container-supporting recess configured for receiving at least a bottom portion of a container body, in accordance with an embodiment of the present disclosure.
Figure 2B:
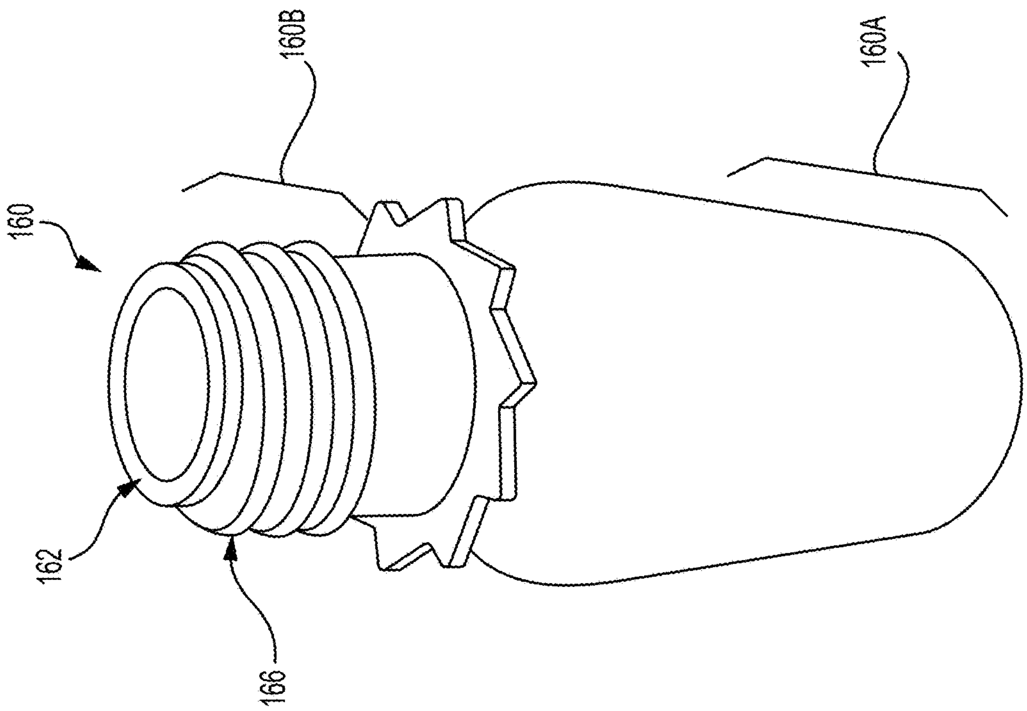
FIG. 2B is a non-limiting perspective view of a container for use with the structural support of FIG. 1, in accordance with an embodiment of the present disclosure.

With reference to FIG. 2A, each of the plurality of container-supporting recesses 122 includes a side wall 124 defining a container cavity 126 for receiving at least a bottom portion 160A of each of the plurality of container bodies 160, being in an upright position. The plurality of container-supporting recesses 122 may be sized and shaped to releasably retain the plurality of container bodies 160 therein, such that the plurality of container bodies 160 can be removed from the respective one of the plurality of container-supporting recesses 122 with an axial movement.

For example, the container-supporting recesses 122 can be configured to provide a more or less tight fit between the container bodies 160 and the side wall 124. For example, the more or less tight fit between the container bodies 160 and the side wall 124 can be sufficient to prevent container bodies 160 from dropping by gravity, out of the container-supporting recesses 122 when the supporting structure 105 is turned upside down.

In some embodiments, the container-supporting recess 122 can include one or more retention element 128 that contacts an external surface of a container body 160 nested therein, which help to retain the container body 160 within the container-supporting recess 122. For example, each container-supporting recess 122 may include a plurality of retention elements 128 distributed around the circumference of the container-supporting recess 122. In the embodiment shown, the plurality of retention elements 128 includes four retention elements 128 distributed equally around the circumference of the container-supporting recess 122, although fewer than four and more than four retention elements 128 are also possible, and/or non-equal distribution around the circumference of the container-supporting recess 122 is possible. In the embodiment shown, each retention element 128 is a protrusion in the material from the side of the retention element and extends along at least a portion of the height (or depth) of the container-supporting recess 122. For example, the retention element 128 can extend from the outer circumference of the container-supporting recess 122 towards its center.

In some embodiments, the retention element 128 can be sloped so that it extends further toward the center of the container-supporting recess 122 at its bottom and less so towards its top (e.g., closer to the top surface 112). In some embodiments, the inward facing surface of the retention element 128 can be shaped to match the shape of the outer surface of the container body 160. For example, when the container body 160 has a generally cylindrical outer surface shape, the retention element 128 can be shaped to match the curvature of the outer surface of the container body 160. Other configurations of the retention features are also possible.

Figure 3A:
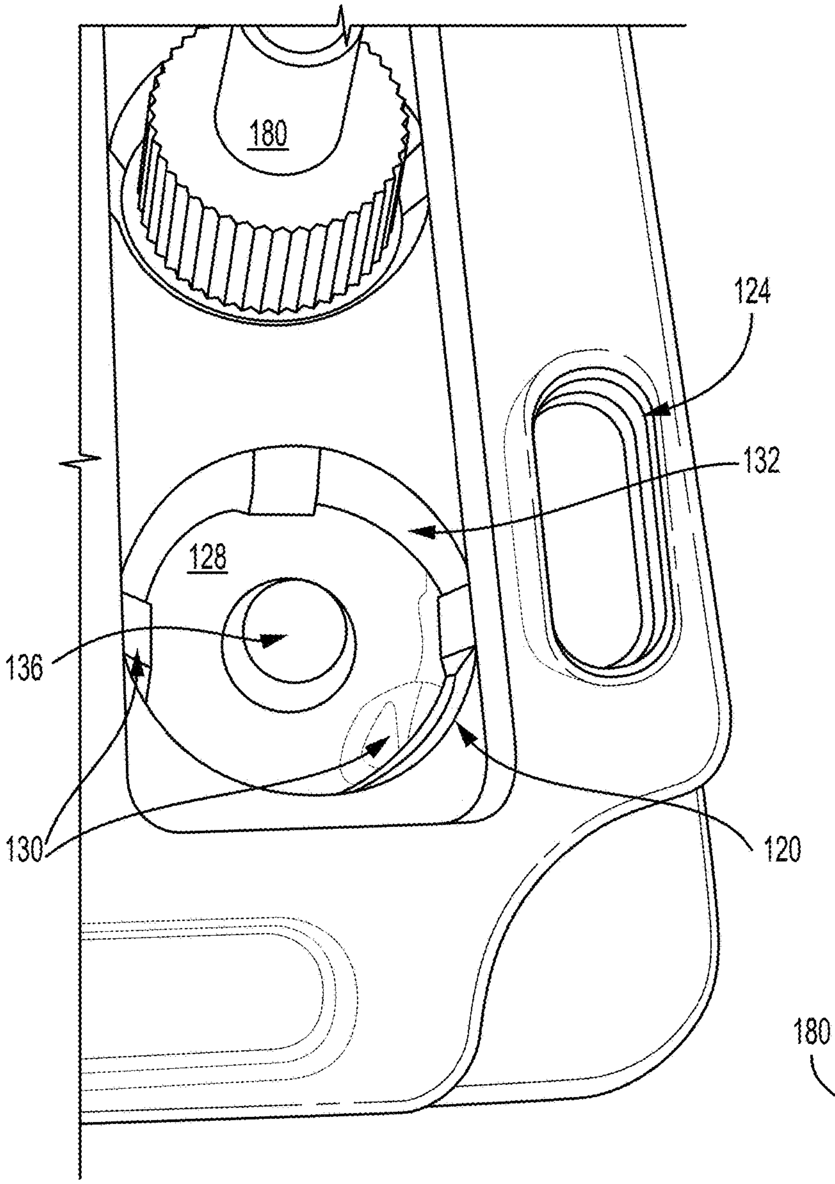
FIG. 3A is a non-limiting close up view of the structural support of FIG. 1 showing a cap-supporting recess configured for receiving at least a bottom portion of a cap, in accordance with an embodiment of the present disclosure.
Figure 4A:
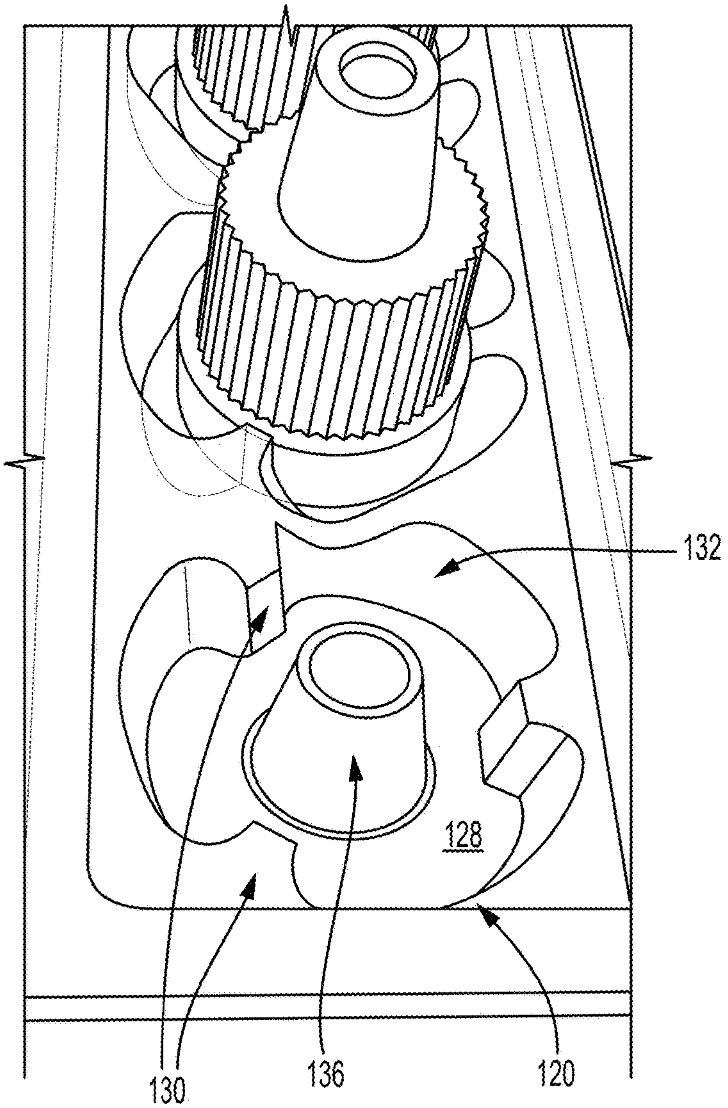
FIG. 4A is a non-limiting variant of the cap-supporting recess of FIG. 3A, in accordance with an embodiment of the present disclosure.

With reference to FIG. 3A, each of the plurality of cap-supporting recesses 120 includes a side wall 132 defining a cap cavity 128 for receiving a bottom portion 180A of each of the plurality of caps 180, 180'. The plurality of cap-supporting recesses 120 may be sized and shaped to releasably retain the plurality of caps 180, 180' therein, such that the plurality of caps 180, 180' can be removed from the respective one of the plurality of cap-supporting recesses 120 with an axial movement.

For example, the cap-supporting recesses 120 can be configured to provide a more or less tight fit between a lip portion 186, 186' of the cap 180, 180' (shown in FIGS. 3B and 4B) and the side wall 132. For example, the more or less tight fit between the lip portion 186, 186' and the side wall 132 can be sufficient to prevent caps 180, 180' from dropping by gravity, out of the cap-supporting recesses 120 when the supporting structure 105 is turned upside down.

In some embodiments, the cap-supporting recesses 120 are each sized and shaped to allow a cap 180, 180' to releasably nest therein. For example, for generally cylindrical shaped cap 180, 180', the cap-supporting recesses 120 will define a corresponding circular shape with side wall 132.

In some embodiments, the cap-supporting recess 120 can include a central post 136 that can help to position a corresponding cap 180, 180' thereon. Alternatively or additionally, the cap-supporting recess 120 can include one or more cap retention element 130 that help to retain the cap 180, 180' within the cap-supporting recess 120. For example, each cap-supporting recess 120 may include a plurality of cap retention elements 130 distributed around the circumference of the cap-supporting recess 120. In the embodiment shown, the plurality of cap retention elements 130 includes four cap retention elements 130 distributed equally around the circumference of the cap-supporting recess 120, although fewer than four and more than four cap retention elements 130 are also possible, and/or non-equal distribution around the circumference of the cap-supporting recess 120 is possible. In the embodiment shown, each cap retention element 130 is a protrusion in the material from the side of the retention element 130 and extends along at least a portion of the height (or depth) of the cap-supporting recess 120. For example, the cap retention element 130 can extend from the circumference of the cap-supporting recess 120 towards its center.

In some embodiments, the cap retention element 130 can be sloped so that it extends further toward the center of the cap-supporting recess 120 at its bottom and less so towards its top (e.g., closer to the top surface 112).

In some embodiments, the cap retention element 130 can be sloped so that it extends further toward the center of the cap-supporting recess 120 at a point along its height compared to at its bottom and its top. The slope can create a peak that allows a lip portion 186, 186' of the cap 180, 180' to rest against or underneath it and be more securely fastened within the cap-supporting recess 120.

Referring back to FIG. 1A, the supporting structure 105 top surface 110 includes a peripheral region 126 that can have a number of features.

In some embodiments, the peripheral region 126 is configured to mate with a corresponding peripheral portion 156 of a lid 150. When assembled with the supporting structure 105, the lid 150 being configured to removably attach to the supporting structure 105, and so enclose the plurality of container bodies 160 and the plurality of container caps 180 there in-between.

Advantageously, the supporting structure 105 and the lid 150 can be formed of a material (the same or different one from the other) that is capable of being sterilized as discussed previously. The holding system 100 (including one or both the supporting structure 105 and the lid 150) can be contained within one or more outer packaging prior to sterilization, which can advantageously further maintain the interior of the holding system 100 sterile during transportation and/or storage. The one or more outer packaging can be made of a plastic, for example a polyethylene bag. Optionally, the holding system 100 can be sealed in the one or more outer packaging under vacuum.

Figure 6A:
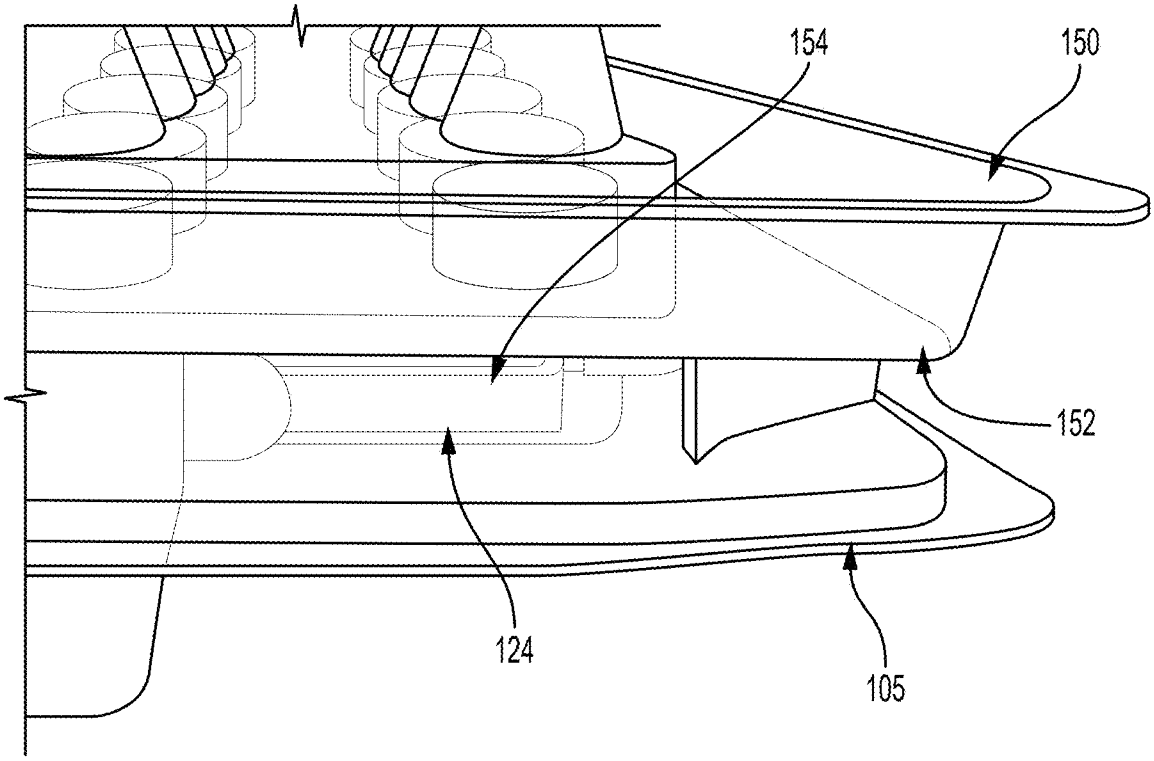
FIG. 6A is a non-limiting first zoomed side view of the lid attached to the structure of FIG. 1, in accordance with an embodiment of the present disclosure.
Figure 6B:
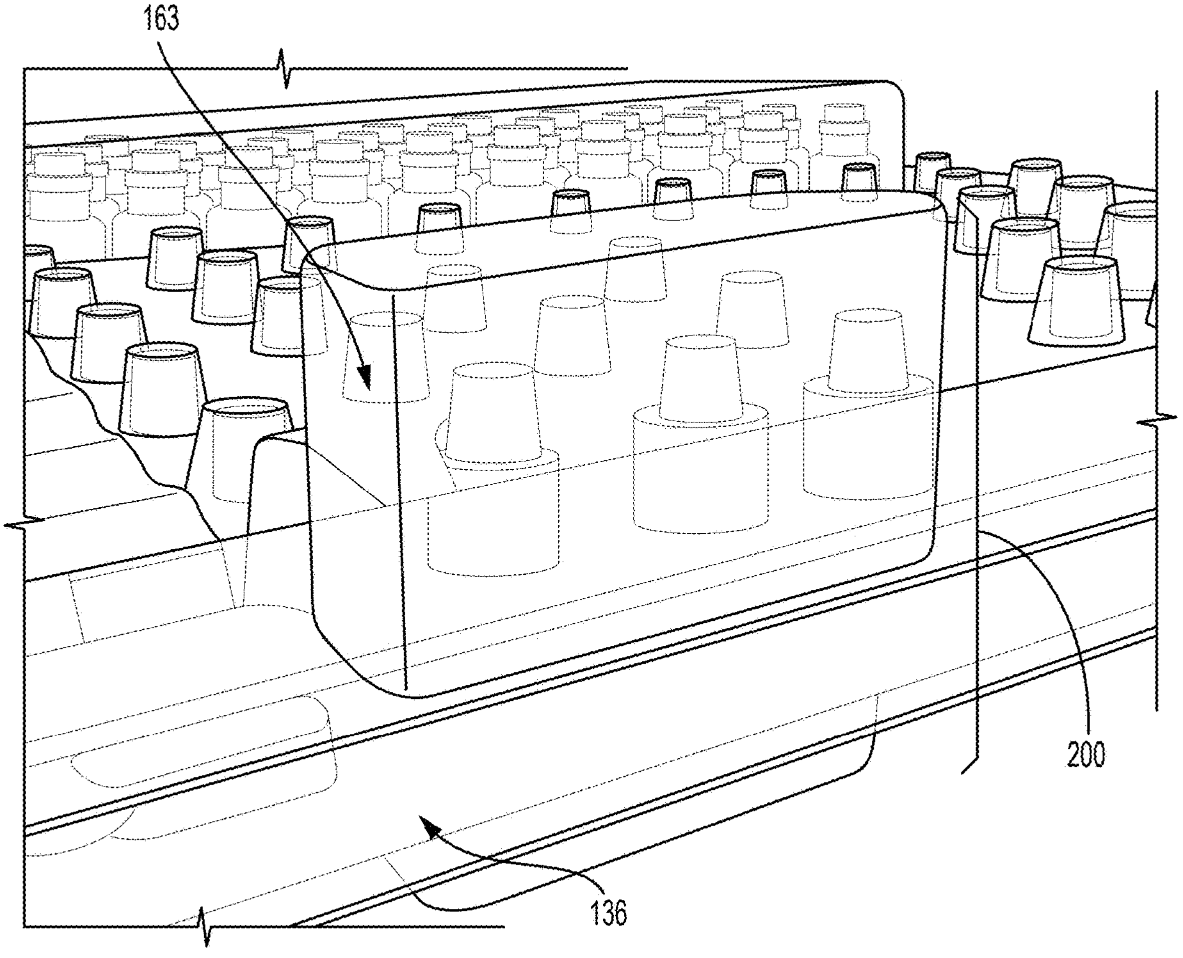
FIG. 6B is a non-limiting second zoomed side view of the lid attached to the structure of FIG. 1, in accordance with an embodiment of the present disclosure.

In some embodiments, with reference to FIG. 1A, the top surface 110 may include a plurality of engaging structures 124 arranged around the peripheral region 126, which are configured for mating and engaging with engaging structures 154 disposed on the peripheral region 156 of a bottom surface 152 of the lid 150 (best shown in FIG. 6A) which can be locked or latched together. Such engaging structures 124, 154 can be protrusions and corresponding recesses. For example, the protrusions and corresponding recesses can be biased towards each other resiliently, in particular as the result of the material properties of the peripheral regions 126, 154. Such protrusions and corresponding recesses can cooperate with each other in a positive-fit manner.

In some embodiments, the top surface 110 may include at least one divot 136 disposed on the peripheral region 126, which extends away towards the bottom of the top surface 110. For example, the lid 150 may also include at least one divot 163 disposed on the peripheral region 156, which extends away towards the top of the lid 150.

In some embodiments, the at least one divot 136 is disposed on the peripheral region 126 and the at least one divot 163 is disposed on the peripheral region 156 such as to form a handling protrusion 200 configured for allowing a user to grab the holding system, for example with fingers contacting the at least one divot 136 and the palm or thumb of the same hand contacting the at least one divot 163.

In some embodiments, the lid 150 can have a profile such that the lid 150 does not have a continuous height.

Figure 5A:
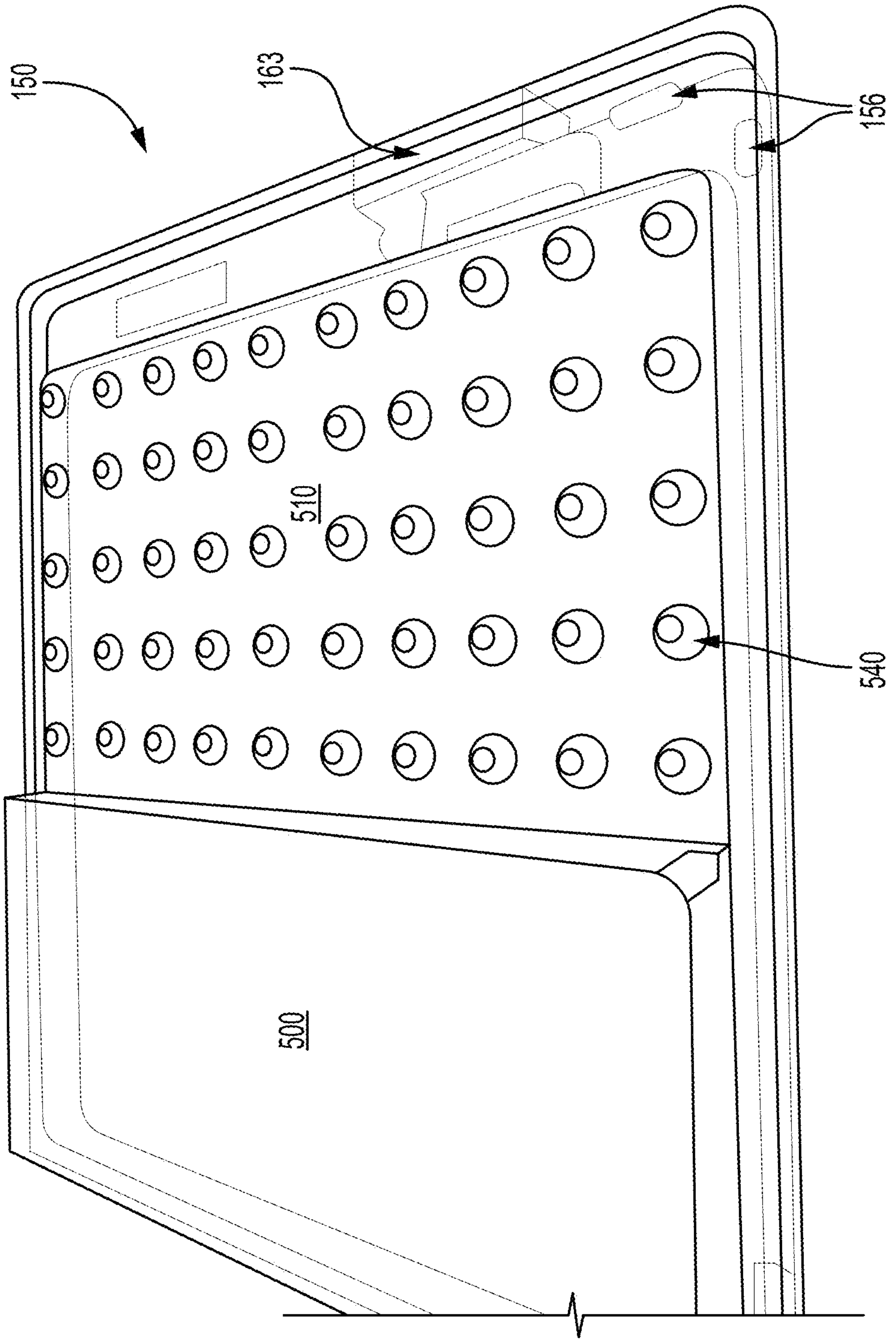
FIG. 5A is a non-limiting top view of a lid for use with the structural support of FIG. 1, in accordance with an embodiment of the present disclosure.
Figure 5B:
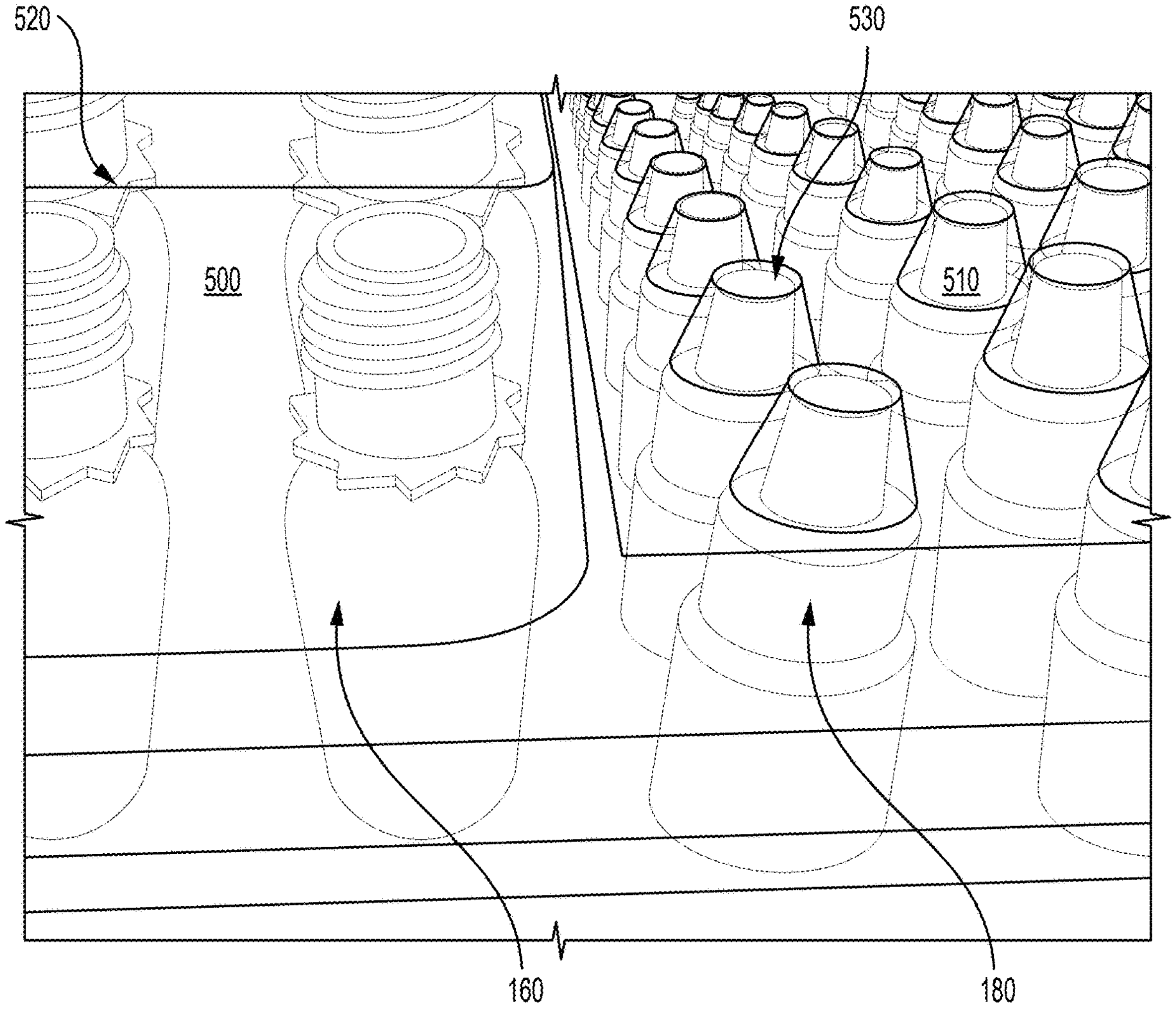
FIG. 5B is a non-limiting side view of the lid of FIG. 5A, in accordance with an embodiment of the present disclosure.

For example, the lid 150 can include an elevated section 500 and a landmine field section 510 so that the lid 150 does not have a continuous height, as shown in FIGS. 5A and 5B. When the lid 150 is engaged with the supporting structure 105, the elevated section 500 is positioned above the container-supporting regions 114 and allow clearance for the greater height of the container bodies 160 relative to the height of the caps 180. The landmine field section 510 includes a plurality of recesses 540 configured for accommodating a top portion of the plurality of caps 180, 180'. The landmine field section 510 brings the top surface 530 of individual recess 540 close to, although preferably not touching, the top of the caps 180, 180' when the caps 180, 180' are placed in the cap-supporting recesses 120 and the lid 150 assembled to the supporting structure 105.

For example, the lid 150 can include a plurality of peaks 156 and valleys 158 so that the lid 150 does not have a continuous height, as shown in FIG. 1B. When the lid 150 is engaged with the supporting structure 105, the peaks 156 are positioned above the container-supporting regions 114 and allow clearance for the greater height of the container bodies 160 relative to the height of the caps 180. The valleys 158 bring the top surface of the lid 150 close to, although preferably not touching, the tops of the caps 180, 180' when the caps 180, 180' are placed in the cap-supporting recesses 120 and the lid 150 assembled to the base 110. In some embodiments, there is a relatively constant space between the top of a respective cap 180, 180' in the cap-supporting region 116 and the valley 158 of the lid 150 as there is between the top of a respective container body 160 and the peak 156 of the lid 150 when the lid 150 and the supporting structure 105 are assembled. Such an arrangement can help in maintaining a sterile environment within the holding system 100, when sterility is desirable.

Figure 3B:
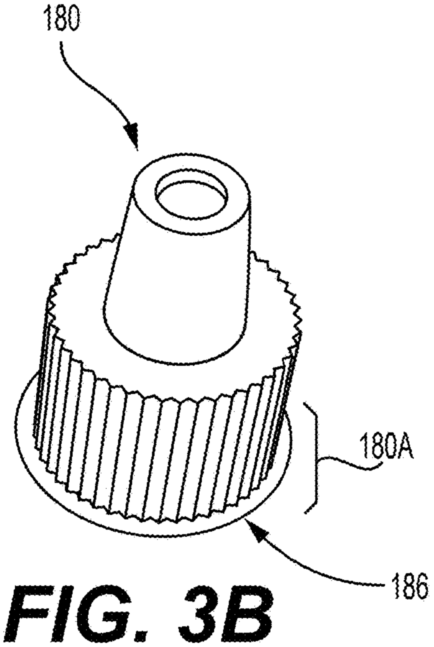
FIG. 3B is a non-limiting perspective view of a cap and stopper for use with the structural support of FIG. 1, in accordance with an embodiment of the present disclosure.
Figure 4B:
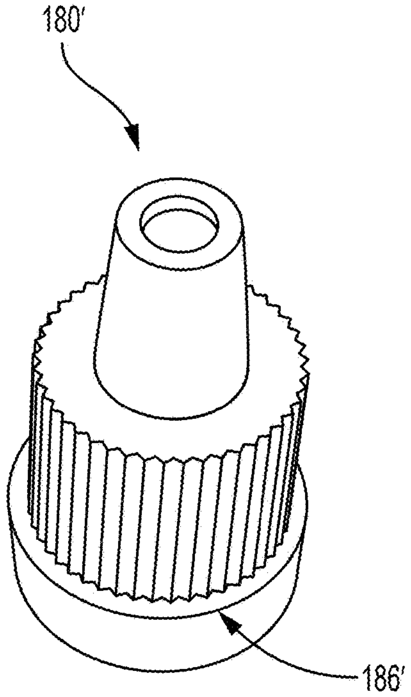
FIG. 4B is a non-limiting variant of the cap of FIG. 3B, in accordance with an embodiment of the present disclosure.

With respect to FIG. 3B, the cap 180 can include a lip portion 186 that may be configured for being retained by the retention element 130 of the cap-supporting recesses 120. In some embodiments, the container is configured for accommodating a nozzle (not shown) together with the cap 180, 180'. The nozzle can be configured to mate with and attach to the mouth 162 of the container body 160. The nozzle can be configured to stay attached to the inside of the cap 180, 180' while the cap 180, 180' is within the cap-supporting recess 120, and while the cap 180, 180' with the nozzle nestled within is removed from the cap-supporting recess 120 and placed onto the top of the container body 160. Tightening the cap 180, 180' onto the container body 160 can cause the nozzle to release from the cap 180 and attach so as to cover the mouth 162 of the container body 160. This arrangement allows the nozzle to remain untouched during holding system of the container, enhancing sterility if desired.

In some embodiments, the container body 160 can be generally cylindrical or may have tapered walls to form a conical-like shape, for example, and have a top portion 160B that is smaller in diameter than the remainder of the container body 160. The top portion 160B can have threads 166, e.g., external threads that are sized and shaped to receive corresponding internal threads on the cap 180, 180' (not shown). For example, the threads may form a Luer-type engagement. The mouth 162 is open at the top such that one or more ingredients can be placed within the container body 160. When the nozzle covers the mouth 162, the composition within the container body 160 can be dispensed through the nozzle by squeezing the container body 160, or inverting upside down the container body 160. In some embodiments, the nozzle is a metering nozzle that allows a metered dose of composition contained within the container to be dispensed at a time.

In some embodiments, the various parts of the container is made of a material that is capable of being sterilized.

In some embodiments, the various parts of the container, including the container body 160, the cap 180 and/or the nozzle can be made of high-density polyethylene (HDPE) or polypropylene (PP), for example.

Usage Process Overview

The holding system includes a plurality of container bodies configured for receiving one or more ingredients therein, for medical, pharmaceutical, cosmetic, or recreational applications.

For example, the one or more ingredients may form a composition tailored (i.e., compounded) to pharmaceutical, medical and/or cosmetic needs of an individual end-user or patient.

For example, the one or more ingredients may form a composition which can be any one of a powder, cream, ointment, lotion, emulsion, gel, suspension, liquid solution, colloidal dispersion, or syrup.

Figure 7:
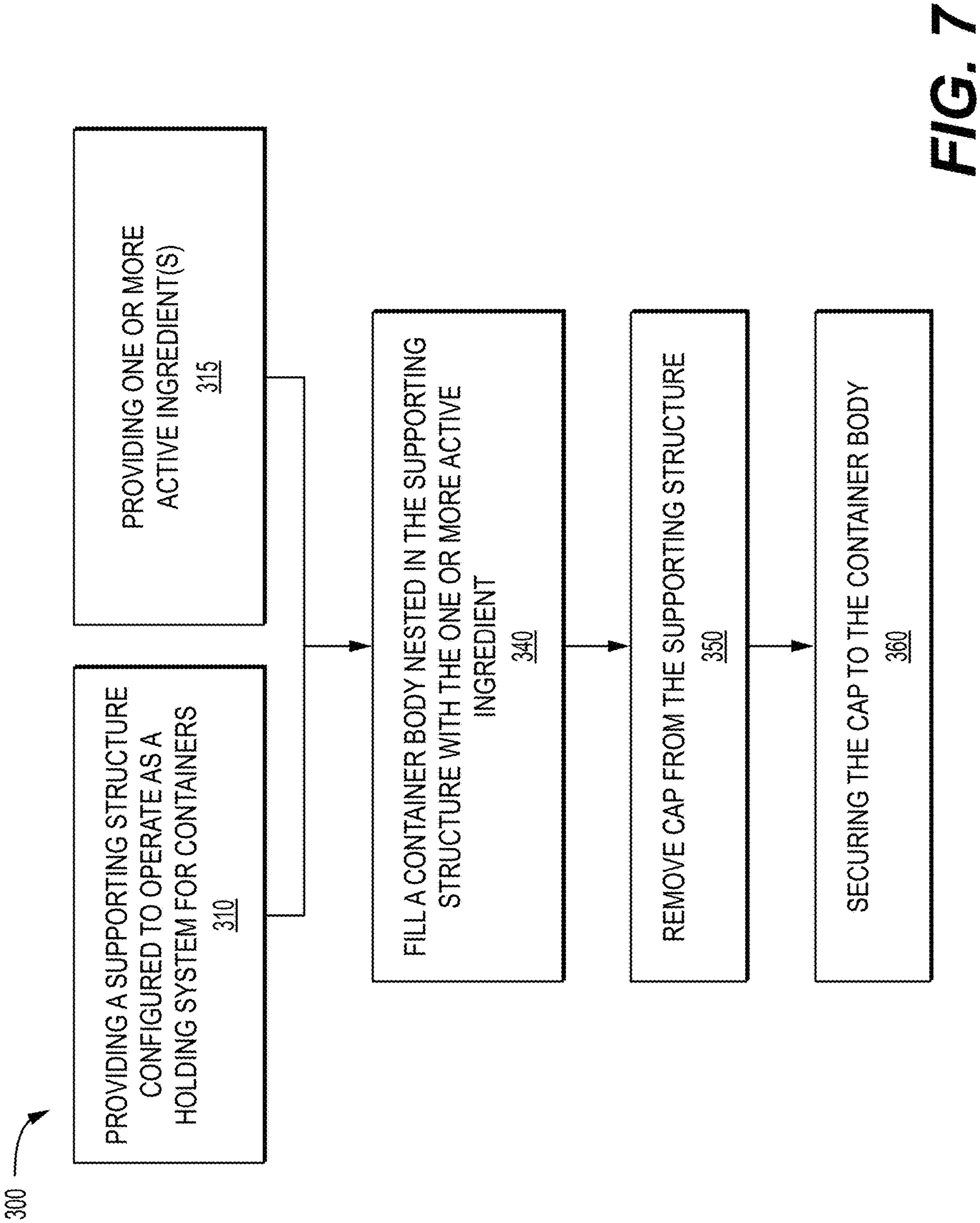
FIG. 7 shows a non-limiting flow chart describing an example process in accordance with an embodiment of the present disclosure.

In a practical implementation of the present disclosure, the holding system may be used with a filling process 300 shown in FIG. 7.

Process 300 includes providing the supporting structure 105 configured to operate as a holding system for a plurality of container bodies 160 and a plurality of container caps 180, 180' in an organized arrangement, at step 310.

Step 315 further includes providing one or more active ingredient(s) for loading into the plurality of container bodies 160.

Advantageously, step 310 and/or 315 is (are) performed within a sterile environment to retain the sterile properties of the operation. This can be a fume hood, sterile tunnel, clean room, or otherwise suitably sterilized environment. The supporting structure 105 can be configured for containing the plurality of container bodies 160 and the plurality of container caps 180, 180' in an ordered, predictable, and easy to use arrangement so that the user can quickly and efficiently fill the container bodies with the one or more ingredients.

Advantageously, the supporting structure 105 may be enclosed in a sterile outer packaging, in which case, the process 300 may include an initial unpacking step (not shown).

When sterility is desired, the supporting structure 105 may be joined with the lid 150, optionally within the outer packaging. Once unpacked, the supporting structure 105 may be separated from the lid 150 under sterile conditions by having the lid face down, for example on a working bench, and the supporting structure 105 being stacked on top of the lid 150. The supporting structure 105 is in such cases advantageously configured for retaining the plurality of container bodies 160 and the plurality of container caps 180, 180' to prevent axial movement thereof when being pulled by gravity.

Once the supporting structure 105 is ready for processing (for example, placed inside an automated filling station), process 300 includes a step 340 of filling a container body nested in the supporting structure with the one or more active ingredient. The filling step 340 can be performed manually or can be part of an automated or semi-automated process. All the container bodies in the holding system can be filled with the same or different ingredients. The filling step 340 can take place one container body 160 at a time, or multiple container bodies 160 can be simultaneously filled.

For example, a multi-spout filler can fill the container bodies 160 as part of an holding system line, with the base on a conveyor belt transported past the spouts. If being filled by hand, multiple container bodies 160 can be filled at once using a multi pipette device for liquid ingredients, for example.

The process 300 then includes a step 350 of removing a cap from the supporting structure 105 and securing the cap to the container body, at step 360.

In some embodiments, the process 300 is carried out as part of an automated or semi-automated filling process. Bar codes, QR codes, or other identifying markers can be placed on the holding system 100, 100' or on individual portions of the holding system 100, 100' such as near a container-supporting region 114 or on individual container bodies. The even arrangement of the container bodies and caps also simplifies the automatic filling procedure. This arrangement facilitates the treatment and processing of containers considerably because the effort in terms of adjustment, control and automation can be simplified. The term "even arrangement" considers unavoidable tolerances of lengths and distances in manufacturing.

Definitions

Examples of the one or more ingredients of the present disclosure include, but are not limited to, antibiotics, analgesics, vaccines, anticonvulsants; antidiabetic agents, antifungal agents, antineoplastic agents, antiparkinsonian agents, anti-rheumatic agents, appetite suppressants, biological response modifiers, cardiovascular agents, central nervous system stimulants, contraceptive agents, dietary-supplements, vitamins, minerals, lipids, saccharides, metals, amino acids (and precursors), nucleic acids and precursors, contrast agents, diagnostic agents, dopamine receptor agonists, erectile dysfunction agents, fertility agents, gastrointestinal agents, hormones, immunomodulators, antihypercalcemia agents, mast cell stabilizers, muscle relaxants, nutritional agents, ophthalmic agents, osteoporosis agents, psychotherapeutic agents, parasympathomimetic agents, parasympatholytic agents, respiratory agents, sedative hypnotic agents, skin and mucous membrane agents, smoking cessation agents, steroids, sympatholytic agents, urinary tract agents, uterine relaxants, vaginal agents, vasodilator, anti-hypertensive, hyperthyroid, anti-hyperthyroid, anti-asthmatics and vertigo agents. For example, a T3/T4 medication.

In certain embodiments, the one or more ingredients of the present disclosure include an extract or portion of a *Cannabis* plant, such as a cannabinoid, a terpene, and the like. The two cannabinoids usually produced in greatest abundance are cannabidiol (CBD) and tetrahydrocannabinol (THC), although there are several dozen different cannabinoids that have been isolated from *Cannabis* plants.

For the purpose of the present disclosure, the pharmaceutical or cosmetic acceptable excipient, diluent, or carrier may be a solid (powder), semi-solid (more or less viscous fluid) or fluid (for example, a cream or an emulsion). The person of skill will appreciate that pharmaceutical or cosmetic acceptable excipients, diluents or carriers are known in the art and may include, but without being limited thereto, anti-adherents such as magnesium stearate; binders, such as saccharides and their derivatives (sucrose, lactose, starches, cellulose or modified cellulose, sugar alcohols such as xylitol, sorbitol or maltitol), proteins such as gelatins, synthetic polymers such as polyvinylpyrrolidone (PVP) or polyethylene glycol (PEG); coloring dyes or fragrance; glidants such as fumed silica, talc, and magnesium carbonate; hydrophilic or hydrophobic lubricants such as talc or silica, and fats, e.g. vegetable stearin, magnesium stearate or stearic acid; preservatives such as antioxidant vitamins or synthetic preservatives like parabens; sorbents or other desiccant; vehicles that serve as a medium for conveying the active ingredient such as petrolatum, gum base gelatin, dimethyl sulfoxide and mineral oil or commercial products such as VersaPro™ Gel, HRT™ Cream, OleaBase™ Plasticized, PLO Gel Mediflo™, Oral Mix™ or VersaPro™ cream, all from Medisca Pharmaceutique Inc (Canada).

For the purpose of the present disclosure, a composition containing one or more ingredients of the present disclosure may be adapted for oral, rectal, vaginal, topical, urethral, ocular, or transdermal administration.

Other examples of implementations will become apparent to the reader in view of the teachings of the present description and as such, will not be further described here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the disclosure have been described and illustrated, it will be apparent to those skilled in the art considering the present description that numerous modifications and variations can be made. The scope of the invention is defined more particularly in the appended claims.

What is claimed is:

1. A holding arrangement, comprising:

a. a cap-and-nozzle assembly for a dropper bottle having a container body and a mouth configured to receive the cap-and-nozzle assembly, the cap-and-nozzle assembly comprising a cap configured to be releasably attachable to the container body and a nozzle configured to allow a composition in the container body to be dispensed through the nozzle; and b. a supporting structure including a cap-supporting recess configured to receive the cap-and-nozzle assembly, the cap-and-nozzle assembly being oriented when received in the cap supporting recess such that the cap resides above the nozzle, wherein:

i the cap-and-nozzle assembly is releasably engaged in the cap-supporting recess, ii the nozzle is separable from the cap and it is nested inside the cap while the cap is engaged in the cap-supporting recess, and iii the cap-and-nozzle assembly is configured to be removable from the cap-supporting recess with the nozzle retained within the cap, and placed onto the container body of the dropper bottle such that tightening of the cap on the container body causes the nozzle to attach to the mouth of the container body.

2. The holding arrangement as defined in claim 1, wherein the cap, when engaged in the cap-supporting recess is configured to maintain the nozzle in a sterile condition.

3. The holding arrangement as defined in claim 1, wherein the supporting structure is configured to hold the cap-and-nozzle assembly in the cap-supporting recess to prevent the cap-and-nozzle assembly from dropping out of the cap-supporting recess by gravity.

4. The holding arrangement as defined in claim 3, wherein the cap-supporting recess is generally circular.

5. The holding arrangement as defined in claim 3, wherein the cap-supporting recess includes a side wall and a bottom wall.

6. The holding arrangement as defined in claim 5, wherein the supporting structure includes a top surface in which is provided the cap-supporting recess.

7. The holding arrangement as defined in claim 6, wherein at least a portion of the cap-and-nozzle assembly received in the cap-supporting recess projects from the top surface.

8. The holding arrangement as defined in claim 7, wherein the cap is generally cylindrically shaped and engages the side wall.

9. The holding arrangement as defined in claim 7, including a plurality of cap retention elements in the cap-supporting recess configured to frictionally engage the cap to maintain the cap in the cap-supporting recess.

10. The holding arrangement as defined in claim 9, wherein the cap retention elements are angularly disposed in the cap-supporting recess.

11. The holding arrangement as defined in claim 10, wherein each of the plurality of cap retention elements includes a protrusion, projecting into the cap-supporting recess.

12. The holding arrangement as defined in claim 11, wherein each of the plurality of cap retention elements extends along a portion of a depth of the cap-supporting recess.

13. The holding arrangement as defined in claim 10, wherein each of the plurality of cap retention elements is sloped.

14. The holding arrangement as defined in claim 13, wherein the plurality of cap retention elements project inwardly from the side wall of the cap-supporting recess.

15. The holding arrangement as defined in claim 9, wherein the cap-supporting recess includes a post projecting from the bottom wall.

16. The holding arrangement as defined in claim 15, wherein the post is configured to position the cap within the cap-supporting recess.

17. The holding arrangement as defined in claim 16, wherein the post has a transverse dimension which diminishes with an increasing distance from the bottom wall of the cap-supporting recess.

18. The holding arrangement as defined in claim 1, wherein the cap-supporting recess is one of a plurality of cap-supporting recesses, and the supporting structure includes the plurality of cap-supporting recesses in which are mounted respective cap-and-nozzle assemblies.

19. The holding arrangement as defined in claim 18, wherein the supporting structure includes a top surface in which are provided the plurality of supporting recesses, the top surface including a channel joining two adjacent cap-supporting recesses.

20. The holding arrangement as defined in claim 19, comprising a lid configured for mating with a peripheral portion projecting from the top surface for enclosing the cap-and-nozzle assemblies.

21. The holding arrangement as defined in claim 20, including a sealing arrangement for assembling the lid with the peripheral portion such that an interior of the supporting structure remains substantially sealed from an environment.

22. The holding arrangement as defined in claim 15, wherein the lid and the peripheral portion are configured to be separated and assembled repeatedly.

23. The holding arrangement as defined in claim 22, wherein the lid and the peripheral portion define mating flanges.

24. The holding arrangement as defined in claim 22, comprising protrusions and corresponding recesses which cooperate with each other to fasten the lid to the peripheral portion.

25. The holding arrangement as defined in claim 23, wherein the cap-and-nozzle assemblies when fully received in respective cap-supporting recesses project above the top surface.

26. The holding arrangement as defined in claim 1, wherein the supporting structure includes a cap supporting region comprising a plurality of cap-supporting recesses including the cap-supporting recess, the cap-supporting recesses receiving corresponding cap-and-nozzle assemblies and a container-supporting region configured to receive container bodies of dropper bottles.

27. The holding arrangement as defined in claim 26, wherein the container-supporting region comprises a plurality of container-supporting recesses receiving respective container bodies.

* * * * *